Jan. 2, 1968  E. F. CUTLER  3,361,042
ROAD SURFACING
Filed May 28, 1965  8 Sheets-Sheet 4
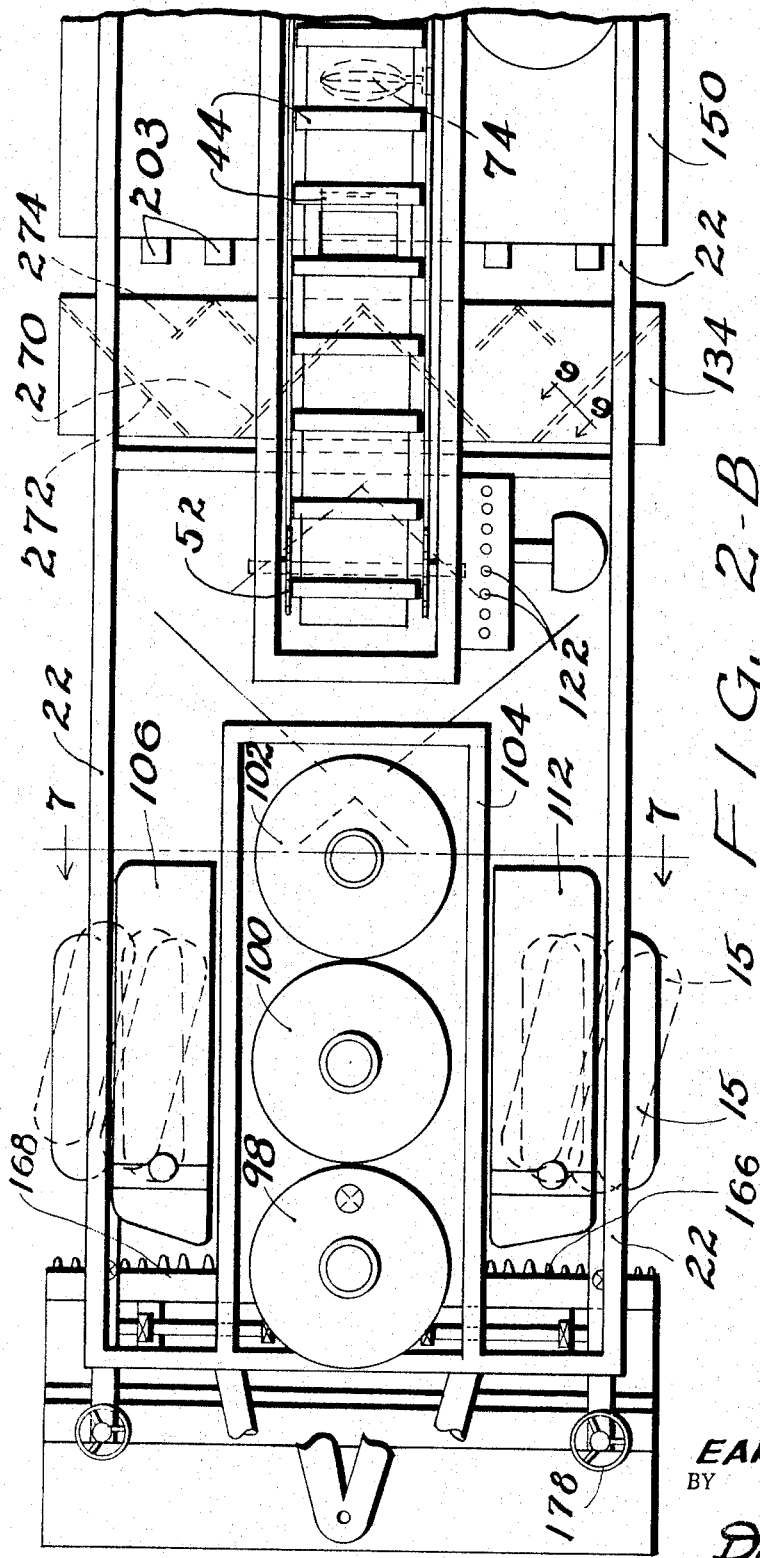
FIG. 2-B
INVENTOR
EARL F. CUTLER
BY
Donald H. Sweet Jan. 2, 1968      E. F. CUTLER      3,361,042

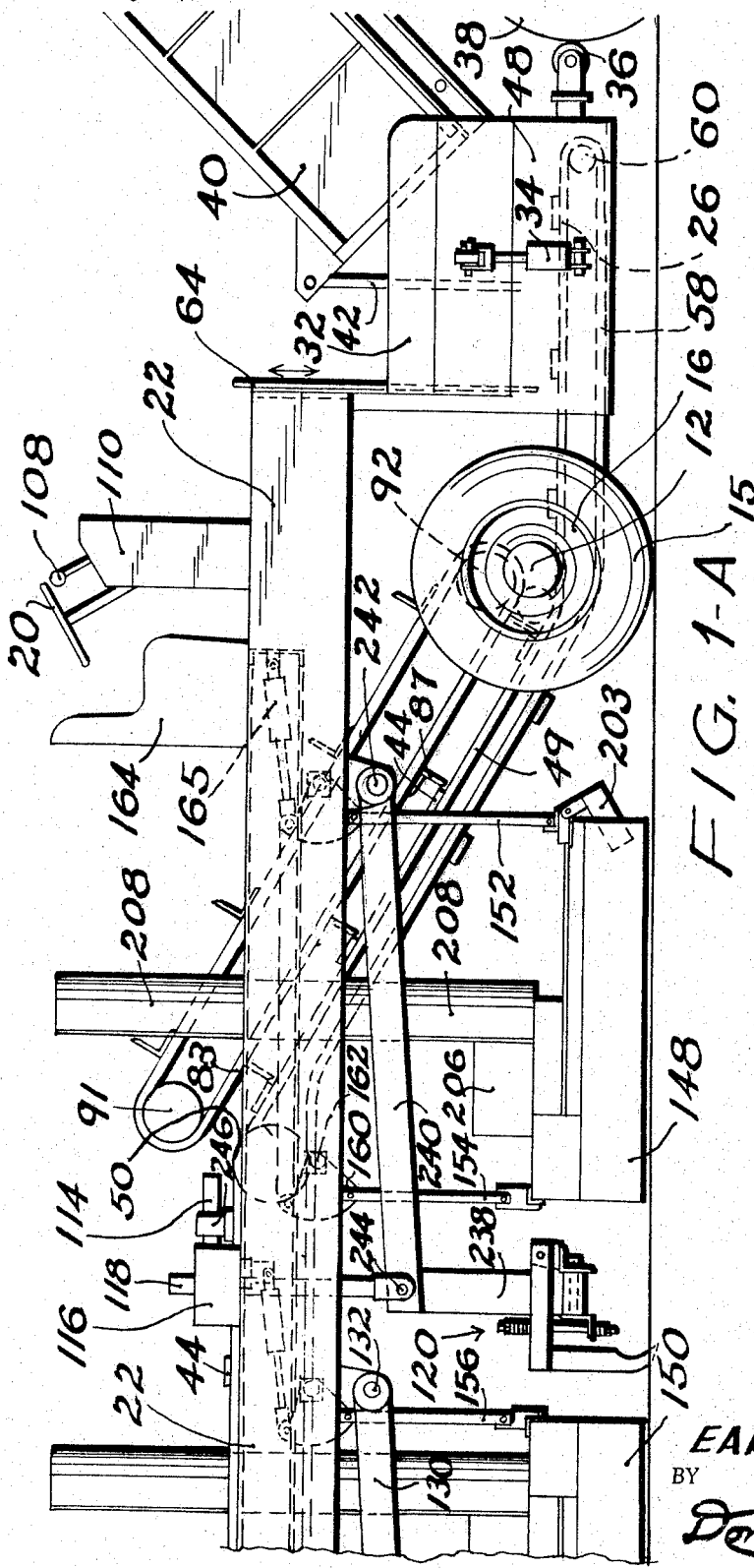

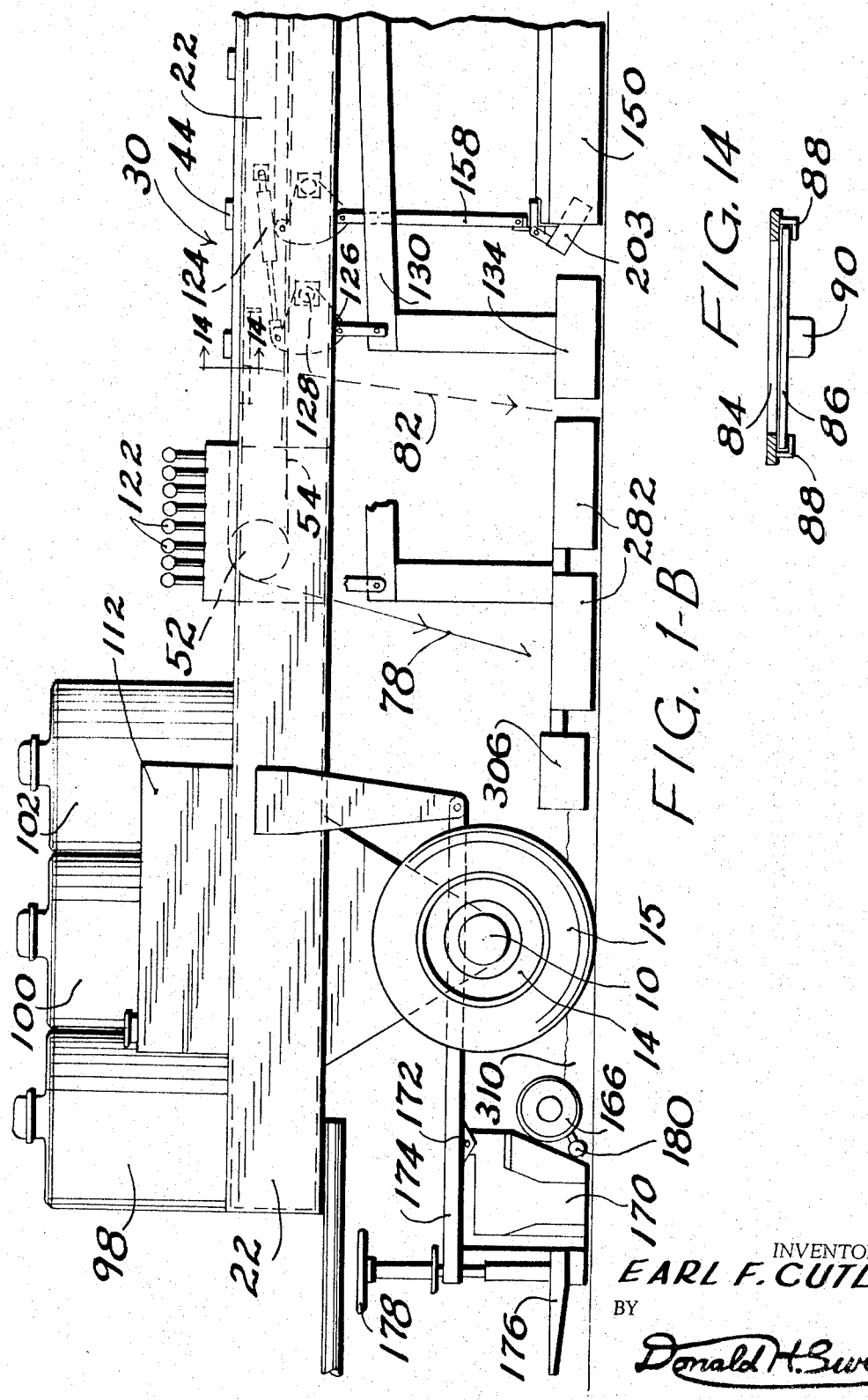

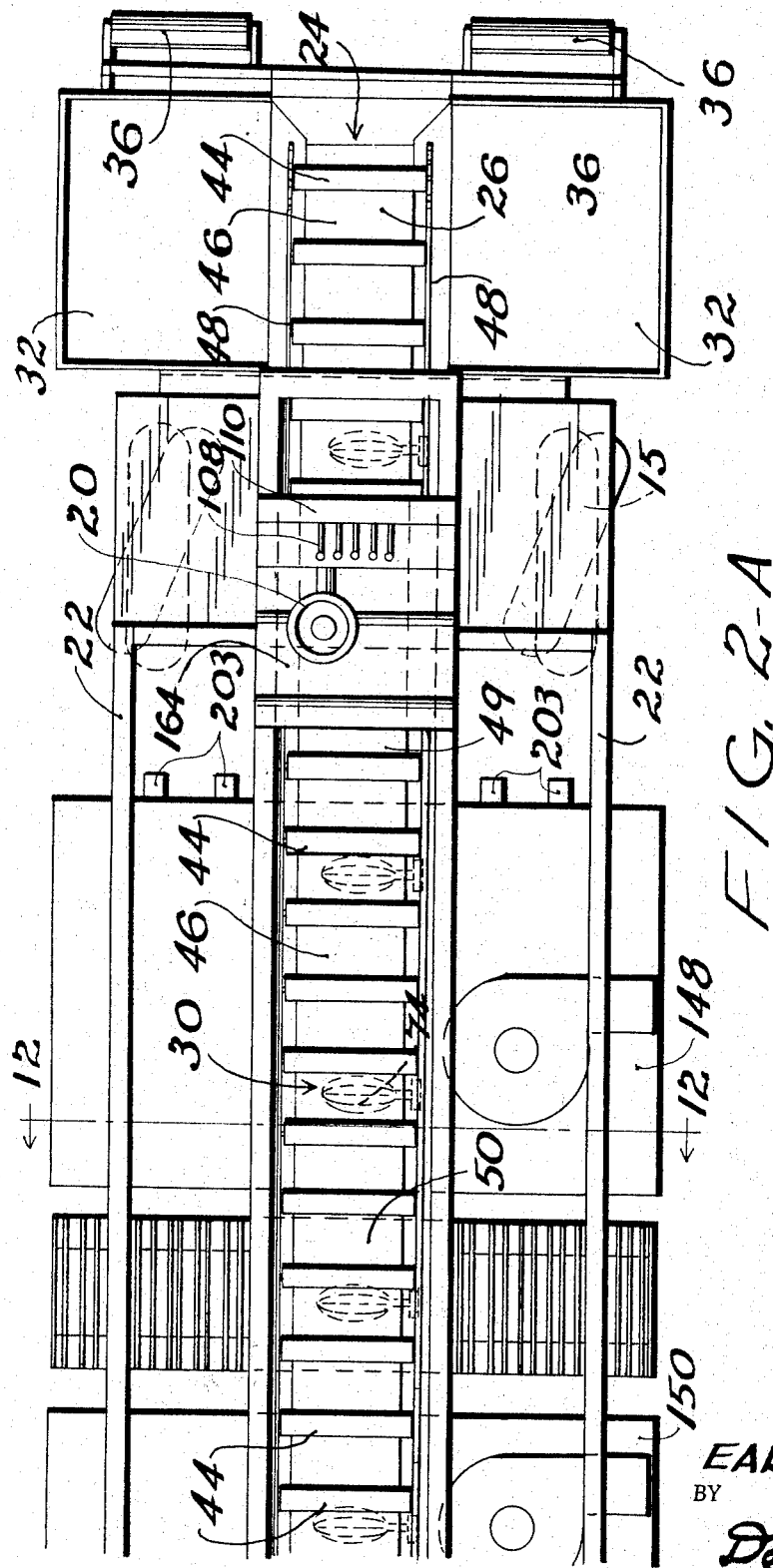
FIG. 2-A
INVENTOR.
EARL F. CUTLER
BY
Donald H. Sweet

ROAD SURFACING

Filed May 28, 1965      8 Sheets-Sheet 5

INVENTOR.
EARL F. CUTLER
BY
Donald H. Sweet

Jan. 2, 1968  E. F. CUTLER  3,361,042
ROAD SURFACING
Filed May 28, 1965  8 Sheets-Sheet 6
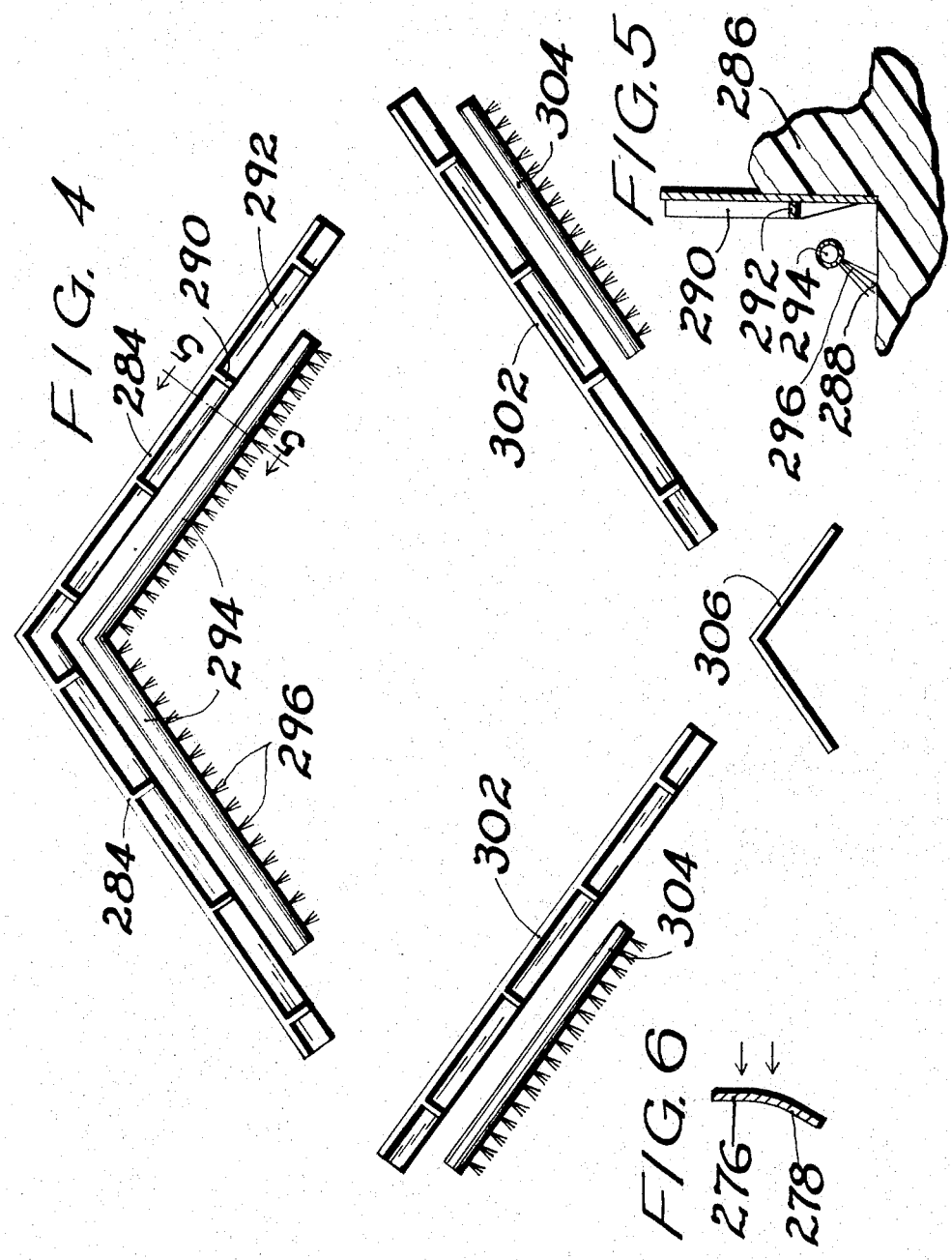
INVENTOR
EARL F. CUTLER
BY
Donald H. Swert Jan. 2, 1968 E. F. CUTLER 3,361,042
ROAD SURFACING
Filed May 28, 1965 8 Sheets-Sheet 7

INVENTOR
EARL F. CUTLER
BY
Donald H. Sweet

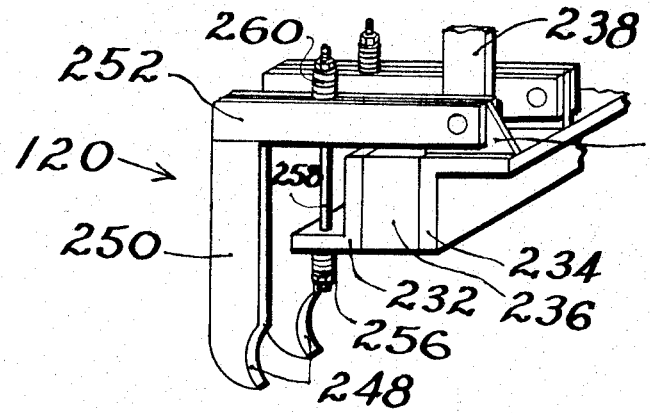
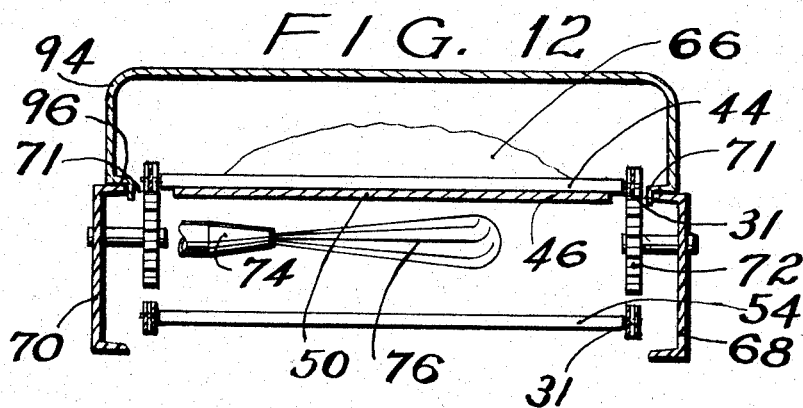
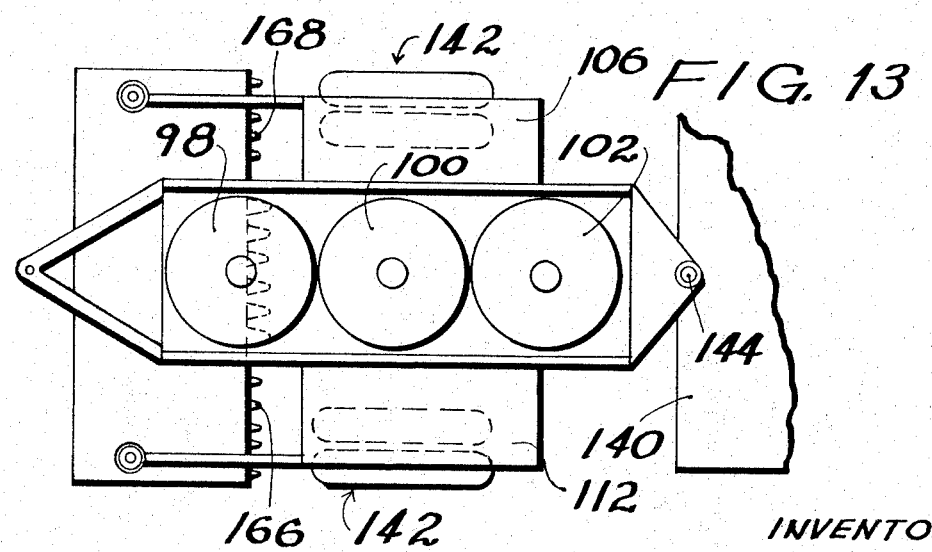

United States Patent Office 3,361,042
Patented Jan. 2, 1968

3,361,042
ROAD SURFACING
Earl F. Cutler, 1217 Crane Drive, Sleepy Hollow,
Dundee, Ill. 60118
Filed May 28, 1965, Ser. No. 459,586
15 Claims. (Cl. 94—23)

ABSTRACT OF THE DISCLOSURE

The clean roadbed of an asphalt concrete highway is subjected to intense radiant heat under an atmosphere of hot non-oxidizing products of combustion inside a hood from which the hot gases are aspirated to prevent them from escaping under the edge of the hood. This raises the surface of the roadbed to temperatures that would set fire to the roadbed and injure it if the hood were filled with air or with an ordinary oxidizing flame.

Then the softened top layer, and a larger quantity of unheated material below it, are broken up into random rubble. Then the random rubble is exposed to a second heating, which gets more than twice as much heat into the roadbed as the first heating.

Additional hot mix may be added at this point if desired.

Finally, the entire hot mass is spread, leveled off, and compacted, ready for immediate use.

---

My invention relates to the resurfacing of all types of asphalt surfaced roads. It has for its primary overall object a method for producing a finished road strip from, say 8 to 12 feet wide, in a single passage of continuous processing over the area to be paved, leaving any additional area of the complete road available for vehicular traffic while the building or rebuilding of the strip is in progress.

A distinctive advantage is that the finished strip is freely available to vehicular traffic within a matter of minutes after the processing is completed.

In its most commonly preferred embodiment, the process includes most or all of the following successive steps:

First: Heating in a non-oxidizing environment and primarily by radiant heat, to temperatures higher than the material could experience in air without being set on fire.

Second: Sacrificing deeply to disarrange the hot material produced by step one, together with more than its own weight of additional lower material not as yet appreciably softened.

Third: Piling the disarranged material in mixed, irregular windrows with maximum exposed surfaces.

Fourth: Heating the piled windrows in a non-oxidizing atmosphere to increase the amount of material heated about two to one and the amount of heat delivered in about the same ratio.

Fifth: Initial planing, leveling, and kneading.

Sixth: Adding very minor amounts of conventional tack coat to help weld the total hot top mixture, to the substrate.

Seventh: Final planing, leveling, and kneading.

Eighth: Tamping and screeding.

Ninth: Compacting, as by conventional rolling.

Of the foregoing steps, steps five and seven may be repeated or omitted, and combined in various sequences to secure optimum results under the operating conditions encountered.

Other objects and advantages of the invention will become apparent as the description proceeds.

In the accompanying drawings:

FIGURE 1–A on Sheet 1 of the drawings is a partly diagrammatic side elevation of about the front half of a unit of equipment for practicing the invention;

FIGURE 1–B on Sheet 2 of the drawings is a similar side elevation of the rear half of the same unit;

FIGURE 2–A on Sheet 3 of the drawings is a partly diagrammatic elevation of the front half of the same unit;

FIGURE 2–B on Sheet 4 of the drawings is a similar plan view of the rear half of the same unit;

FIGURE 4 is a plan view of the main kneading unit, showing the working elements only;

FIGURE 5 is a detail section as on line 5—5 of FIGURE 4;

FIGURE 6 is a detail section on line 6—6 of FIGURE 2–B;

FIGURE 11 is a partial perspective of the scarifier;

FIGURE 12 is a partial section on line 12—12 of FIGURE 2–A;

FIGURE 13 is a fragmentary view similar to FIGURE 2–B indicating a modified frame construction; and FIGURE 14 is a detail section on line 14—14 of FIGURE 1–B.

Figure 3:
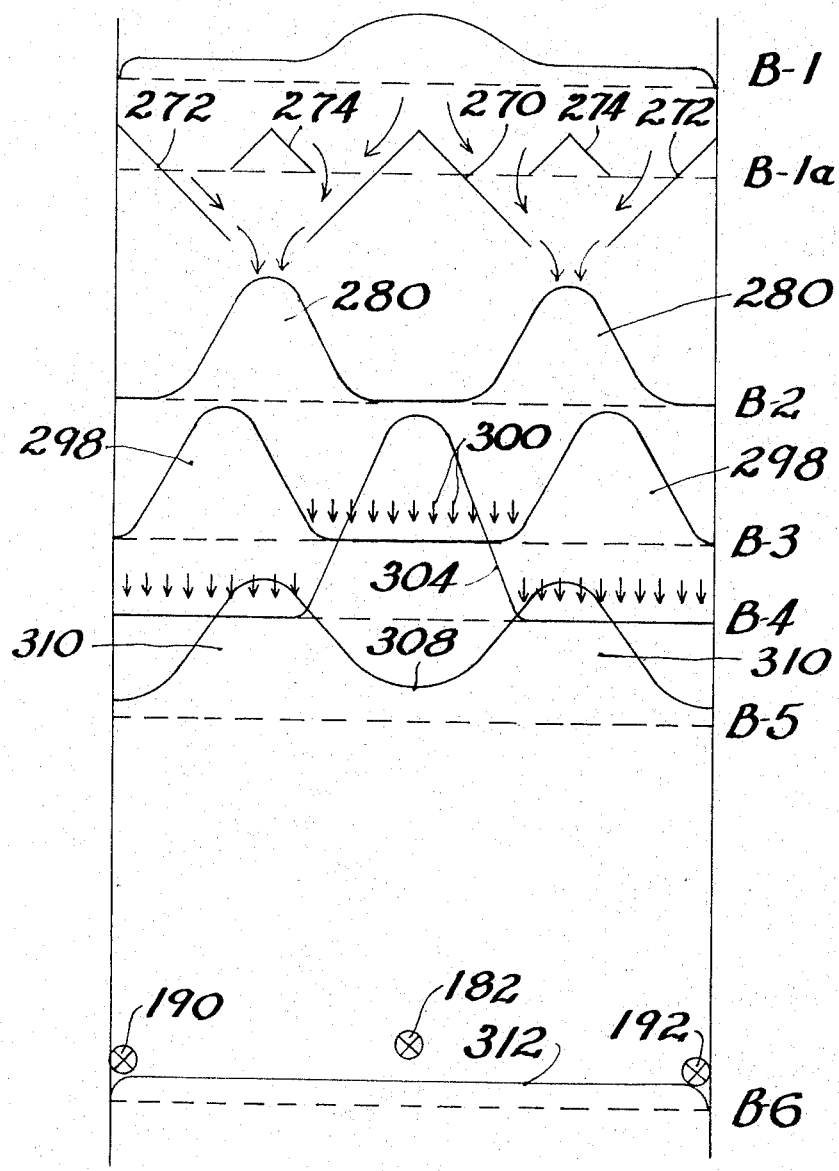
FIGURE 3 is a diagrammatic chart indicating the path of the hot mix and the transverse exaggerated profile of the road surface at certain stages in the process.

In the embodiment of apparatus selected for illustrating the practice of the invention, the complete chassis unit has an overall length of about 40 or 50 feet, an overall width of about 8 feet and a weight of about 15 tons when fully equipped. It is supported on a rear axle 10 and a front axle 12. Each axle is equipped with road engaging pneumatic tires 15 mounted on rear wheels 14 and front wheels 16.

The chassis may have any suitable transmission of power to the running gear but I prefer the now quite well-known hydraulic transmission to each of all four wheels. Internal combustion engine power units at 106 and 112 (see FIGURE 2–B) provide one source of compressed oil at 2000 pounds gauge and another source at 5000 pounds gauge. Distribution of the oil to the running gear and to the hydraulic pistons and motors that manipulate and adjust the various earthworking units carried by the chassis is under control of a series of valves 122. As all these mechanisms are well-known in the art and per se form no part of my invention they are merely indicated in the drawings without disclosure of details.

Individual drive to each of four wheels and making all the wheels dirigible for steering purposes takes care of most of the situations encountered. For work in terrain where the roads are narrow and the surves short, the maneuverability may be increased by having the frame in two articulated portions, as described hereinafter in connection with FIGURE 13.

The mix supply

The front end of chassis frame 22 extends forward beyond the front axle 12 and carries a receiving hopper 24 projecting forward at a low level and housing the front horizontal reach 26 of a mix conveyor. The hopper itself is only about ⅓ as wide as the strip to be processed. It is provided on each side with a folding wing 32 and each folding wing is provided with a hydraulic cylinder linkage at 34 for rotating it from a position extending laterally and only slightly upward to a much more steeply inclined position.

The extreme front end of the frame is provided with transverse roller bumpers 36 on each side suitably spaced to bear against the rear wheels 38 of a conventional truck employed to deliver hot mix to the paving unit. I have indicated the raised body of the truck at 40 and the dangling tailgate of the truck at 42. In operation, the roller bumpers 36 push the truck along in the position indicated in the drawings while the conveyor 30 removes the hot mix falling out of the truck body 40.

Eventually the truck body 40 will become empty and the driver of that truck will drive it away and another truck will be brought in to continue the supply. During this change-over, the paving unit can continue uninterruptedly by lifting the wings 32 to gather the pile of material that is piled on the hopper as long as the truck is in place. By the time this reserve storage is used up, there is time for the empty truck to go away and a new full truck to replace it.

The mix conveyor 30 has support on a floor 46, with a sprocket chain 31 along each side, and spaced pusher bars 44 extending from side to side and adapted to travel under the mass of mix in the hopper and push gobs of it along the underlying apron, or floor 46, provided with side wings 48 to keep material from falling off laterally. The wings 48 are spaced above the floor 46 to leave a slot for passage of the slats 44.

This flooring extends rearward under the front axle 12 and up an inclined ramp 49 to a horizontal catwalk beginning at 50 and running substantially the entire length of the front frame portion. The conveyor chain 31 and slats 44 then pass around a reversing pulley 52 and back to the front in a long idle reach at 54. They slide down a return ramp and horizontally forward at 58 to a front idler pulley at 60.

A vertically adjustable barrier gate 64, indicated in the drawings, extends down to limit the amount of hot mix that can pass out under its lower edge as each slat, or cross piece, 44 comes along. The details of the hopper and gate are well-known in the art and per se form no part of the present invention and accordingly this disclosure is not encumbered with those details.

One material obstacle limiting the effectiveness of processes such as that herein described, has always been the difficulty in getting the finished roadbed hot enough so that subsequent cooling will weld it into a unitary structure capable of enduring working loads. The mix is first heated in a stationary heating plant and then loaded into trucks and the trucks have to drive an extremely variable distance and there is nothing to prevent the cooling of the mix during its travel and at the place of application it is usually applied in the condition in which it arrives, either with or without a little preheating of the pavement on which it is to be deposited.

Referring now to FIGURES 1, 2, and 12 each slat 44 passes under and through the bottom of the hot mix piled in the hopper 24 and pushes out of the pile a slug of material the size of which is regulated by the position of the cutoff plate 64. This slug is pulled by the advancing slat up the inclined ramp at 49 and along the long horizontal apron 50 to the rear end of the machine, where it is dropped onto the roadbed, which has been subjected to processing by the initial heating and the scarifying and the second heating described hereinafter. In FIGURE 12 one of the slats 44 is indicated as pushing a pile of hot mix 66, being driven by the conventional sprocket chain 31, with the return reach sagging down more or less. The framework for the conveyor includes side channels 68 and 70 which provide pivotal mountings for the sprockets 72.

At suitable intervals along the length of the apron 50 I position flamethrowers 74, one of which is indicated in FIGURE 12 as throwing a jet of flame 76 across under the apron 50. In this way substantial amounts of heat can be delivered to raised the temperature of the slug 66. When necessary, it is possible to have the material hotter when it is dropped on the roadbed than it was when it was received from the truck. The side channels 68 and 70 provide a partial enclosure, open at the bottom, leaving narrow exit slots 71 along each side of the apron 50. In this long, inverted pan the products of combustion spread out to provide hot gases under substantially all the apron 50, which hot gases are sufficiently diffused by passing up through the slots 71 to require neither a stack nor a circulating power means.

I have also indicated a light hood 94 having lower edges 96 bent to hook on the channels 68 and 70. This helps protect the new mix in cold or rainy weather.

It will be obvious that the entirety of each gob 66, may be pushed by the slat to the end of the apron 50 and will then fall directly to the roadbed below, as indicated at 78.

Under certain operating conditions, for instance when the rate of travel over the ground is slow and the amount of fresh mix to be deposited is unusually large, it is desirable to precipitate part of the fresh mix as indicated at 78 in FIGURE 1–B and a minor fraction is dropped in advance as indicated by the dotted line and arrow 82.

Referring to FIGURES 1–B and 14, there is a slot 84 in the apron 50 and a closure plate 66 is slidably mounted below it in conventional guides 88 and provided with a downwardly turned ear 90 at one end by means of which an operator can push the plate 86 to any desired position. With the slot wide open more than half of the fresh mix would be discharged at 82 but any smaller fraction can be easily secured by adjusting the position of the plate.

The ramp 49 extends diagonally upward and rearward to carry the fresh mix above a series of operating mechanisms for conditioning the original roadbed to receive the material. Depending on the consistency of the fresh mix it may have a tendency to slide down the ramp 49 and over the rising slats 44. I have indicated a "top" conveyor having a lower reach 84 spaced close above the ramp 49 and equipped with angle irons 88, each having a leg projecting down to the ramp 49 and cooperating with an adjacent slat 44 to prevent the material from cascading. The return reach is indicated on the drawing as well as an upper guide pulley at 91 and a lower guide pulley at 92. It will be obvious that the pitch of the ramp 49 is a matter of compromise between the level of the receiving hopper and the level of the apron 50 and the length of the frame 22. Thus, the need for the top conveyor might be avoided by raising the receiving hopper a few inches or elongating the frame 22 two or three feet, or designing the operating units below the frame to leave a little more clearance, or a combination of all three adjustments.

Power

Power is required to move the unit from place to place, and to move it controllably and accurately at very slow speeds when processing the roadbed. There are also a multiplicity of working tools, and each of these is driven by a hydraulic cylinder or in some instances a hydraulic motor and worm gear.

Referring to FIGURE 2–B, I have indicated three fuel containers 98, 100, and 102 held in a separate framework. The output from the power sources 106 and 112 goes to the multiple control levers 122 (see FIGURE 1–B) which embody control valves for controlling the advance of the unit, with continuous precise adjustment of the speed of travel. There are also included valves for the motor 246 and all the simpler mechanisms, such as the hydraulic piston 124 adapted to rotate a plate 126 pivoted at 128 and lift the carrier arm 130 shown on FIGURE 1–A and on FIGURE 1–B around its pivot at 132 to raise and lower the housing containing the first set of leveling blades 136. Because the scarifier 120 is heavy I employ a motor 246 (see FIGURE 1–A) driving a worm in the housing 116 for moving the adjusting screw 118 up and down to adjust the position of the scarifier. As such running gear and adjusting mechanisms are all old and well-known in the art this description is not encumbered with details.

Referring to the modification on FIGURE 13, the frame is divided into a front section 140 and a rear section 142, the rear wheels 16 remain dirigible but the entire rear portion 142 may also be rotated around a vertical pivot at 144. This division of the entire frame into two sections, combined with four wheel steering, adds materially to the ability to negotiate sharp turns.

*Operating sequence*

Referring now to FIGURES 1–A and 1–B, the main reach under the frame 22 is occupied by a series of five operating units, and other units for operating on the roadbed are positioned to the rear of the rear axle 10. The first working unit to operate on the roadbed is the front heater 148, which delivers intense heat, chiefly by radiation, to raise the surface temperature of the roadbed. Next comes the scarifying unit 120 which gouges deep grooves 1½ inch apart in the roadbed, to a level considerably below the level to which the bed has been softened by the heater 148. The softened material is broken up and mixed rather crudely with cold fragments gouged out of the roadbed. Then the second heater 150 passes over the rubble and delivers a second, larger increment of heat.

Both heaters 148 and 150 are carried on vertical hangers 152 and 154 for the front heater and 156 and 158 for the rear heater and each hanger may be raised and lowered by turning a pivoted adjusting plate 160 around its pivot 162 by means of a suitable hydraulic piston such as that indicated under the driver's seat 164 at 166 in FIGURE 1–A.

The next unit 134 has a plurality of planing and kneading blades indicated in plan view in FIGURE 2–B, with a detail view in FIGURE 6, to be described hereinafter.

The next and last working unit in front of the rear axle 10 is shown in elevation in FIGURE 1–B and the working parts are shown in FIGURE 4 by themselves for clearness.

To the rear of the rear axle I provide conventional spreading helices 166 and 168, one on each side of the center. To the rear of the spreaders 166 I provide a conventioner tamper screed 170 pivoted at 172 to a supporting arm 174 which may be adjusted vertically by an operator standing on the platform 176 and manipulating control wheels 178.

Figure 7:
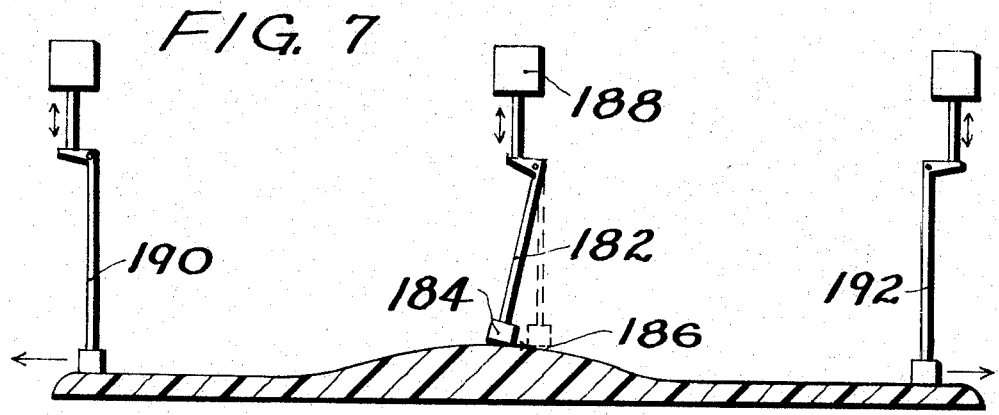
FIGURE 7 is a diagram as in section on line 7—7 of FIGURE 2–B indicating the positioning of certain sensing elements.

Close in front of the tamping screed 170 I have indicated sensing elements for automatic control of the helices 166 and 168 and the delivery of new mix. Referring to FIGURE 7 and FIGURE 3, the central sensing element 182 has a conventional blade 184 adapted to engage the roadbed material at 186 and be deflected thereby to open and close electric circuits 188 fro controlling the delivery of hot mix by the conveyor so that the final overall level is suitably maintained. I also provide a sensor element 190 at the left in FIGURE 7 and 192 at the right, positioned at the edge of the strip. Each of these is connected to its corresponding helix 166 or 168 to control the rate at which the material is pushed away from the center and leveled, in a preliminary way by the helix itself, and finally by the screed 170. The positions for the three sensors are diagrammed in FIGURE 3.

As the complete unit carried by the arms 174, including the helices and the screed and sensor controls is old and well-known in the art and per se constitutes no part of my present invention its position has been indicated and its functioning described without encumbering this description with well-known details.

*Heating*

The heating units 148 and 150 are substantial duplicates except for their orientation with respect to the frame 22. The first unit 148 works on cold material and it is relatively immaterial which end of its operates at the higher temperature, but it is mechanically convenient to position it with the hot gases in it moving concurrent with the relative movement of the bed that is being heated. The final heater 150 operates on the rubble coming from the scarifier and the material issuing from under it will be at the maximum temperature. Accordingly, the nozzles 203 of the rear heater 150 are at the rear ends of the cells which they heat, and the hot gases are moving in counter-current relationship with the material being heated.

Figure 8:
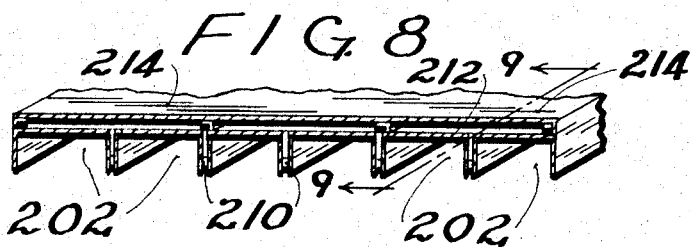
FIGURE 8 is a detail isometric projection of a heater unit, as in section on line 8—8 of FIGURE 9.
Figure 9:
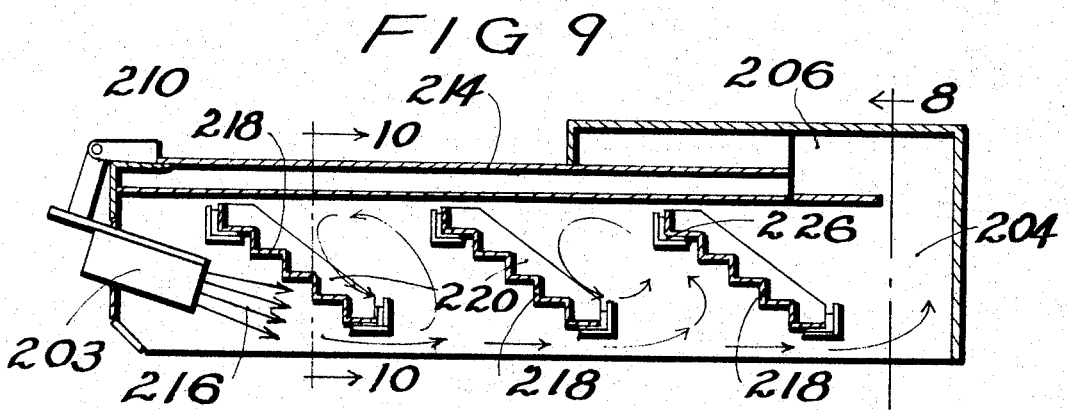
FIGURE 9 is a section of the heating hood on line 9—9 of FIGURE 8.
Figure 10:
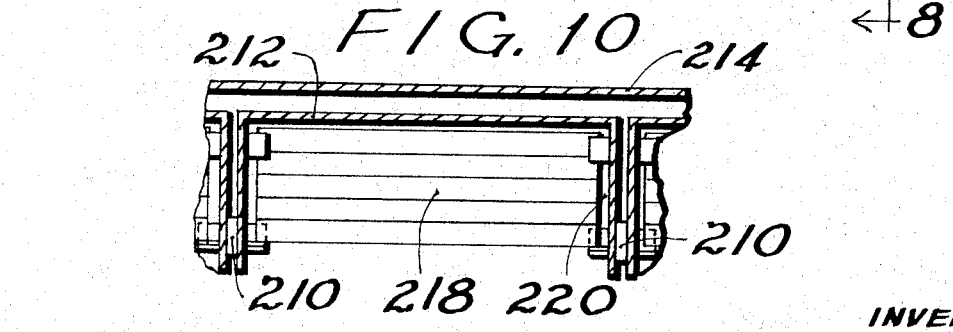
FIGURE 10 is a detail section on line 10—10 of FIGURE 9.

Referring now to FIGURES 8, 9, and 10, each of the heaters illustrated is a sheet metal housing defining six longitudinal tunnels 202 jointly spanning the entire width of the strip to be paved. Each tunnel is an inverted channel about two feet wide and about half as high, open at the bottom, with the fourth wall defined by the roadbed to be heated.

It is desirable to have the flame in the tunnel smokeless, and it is produced by a mixture of air and pentane with a small excess of fuel so that the atmosphere in the tunnel is chemically of a gently reducing character and there is insufficient oxygen to support additional combustion based on volatilization of the material of the roadbed. There is a burner 203 for each of the six channels.

To secure a desirable and accurate control of the pressure and flow in the tunnel, with very slight leakage, if any, laterally out into the atmosphere, but no intake of air from the outside, each heater is provided with a header 204 communicating with the discharge ends of all the tunnels and with an upper housing 206 in which a conventional adjustable fan unit acts on the gases and pushes them up the stack 208, which is only high enough to carry the products of combustion far enough to avoid inconveniencing personnel.

The channels are fastened together side by side by welding them to suitable spacer blocks 210 (see FIGURE 10). Spaced above the roofs 212 of the tunnels I provide a hood 214. This provides a space for stagnant air or other insulation to permit the roofs 212 to be 100° F. or so hotter than they would be if they were exposed to open atmospheres.

Because the material to be heated is of a predominantly black or dark coloration, it is besirable to arrange to deliver heat to its primarily by radiation. A black surface has a maximum coefficient for the absorption of radiant energy, whereas contact between a horizontally moving gas current and a colder body lying below the current is relatively inefficient. As best indicated in FIGURES 9 and 10 each tunnel contains a series of radiants, of which three are indicated in the drawings. Each radiant is positioned in a general plane inclined downwardly and in the direction of movement of the current of burning gases, indicated at 216 in FIGURE 9.

Each of the radiants is illustrated as a corrugated main plate 218 having stiffening flanges 220 for structural strength. It needs only to support its own weight, but as it will float in hot gases that may be at 3000° F. or more, the strength necessary to support its own weight must be carefully provided. Such radiants can be made of dark colored ceramic, or of special metal alloys capable of enduring such temperatures without losing their structural strength. It is estimated that between 80% and 90% of the heat that gets into the roadbed comes by radiation from these radiants rather than by mechanical contact with the flame. In the range of working temperatures, a fifty degree increase in the operating temperature of the radiant represents a surprisingly large percentage increase in the amount of effective radiation projected down against the roadbed.

Within the temperature ranges involved, the total radiant energy delivered by a unit area of radiating surface varies approximately as the seventeenth power of T where T denotes degrees Kelvin.

Scarifying and mixing

Referring to FIGURES 1–A and 11, the scarifier comprises a rear angle bar 232 and a front angle bar 234 arranged back to back and connected by spacer elements 236 at suitable intervals. At least two of these spacer blocks, one near each end, are continued upwardly to function as a hanger arm 238 rigid with the radius rod 240 extending forward to a pivot at 242. Because this is a heavy unit I connect the screw 118, pivoted to the radius rod 240 at 244, to the internal threads of a conventional worm wheel driven by a worm on the shaft of the hydraulic motor 246.

Each individual troweling point 248 is a forwardly concave gouging tool at the lower end of a shank 250. These are rigid with spaced arms 252, which straddle pivot blocks 254 on the front angle 234.

Resilient means is provided for pushing each individual scarifying point 248 downward, and the normal working downward force on each of the 72 points, spaced 1½ inch apart, is about 200 pounds. A lower compression spring 256 abuts the angle 232 and pushes downward at the bottom of the riser bolt 258 and an upper compression spring 260 has a top abutment on the riser 258 and pushes downward on the arms 252. These parts are illustrated in the drawings in the position of maximum load, and the clearance is sufficient to permit each point 248 to move down about two inches from the position shown in FIGURE 11 by counterclockwise rotation around its pivot.

A substantial thickness of softened material is formed under the heater 148 and strikes the point 248 about centrally and is wrinkled up and torn, while the lower end of the point gouges a groove in the relatively cool material below the softened skin. The entirety of the broken chunks and wrinkled skin works its way through the spaces between the scarifying points, and the second heater 150 passes over this very irregular piled material, which exhibits substantial grooves and ridges with a transverse spacing of one and one half inches. This random piling of the fragments exposes a much greater area to the incident radiation, including many pockets where the radiation can strike one inclined side wall of a piece of material and be reflected across to hit another surface. It is estimated the total amount of heat that gets into the loosened material under the second heater is at least twice as much as the amount absorbed from the heater 148.

Kneading and planing

Referring to FIGURES 1–B, 2–B and 6, I have indicated a box frame 134 containing blades adapted to knead the very hot, loose material issuing from under the heater 150. The diagrammatic plan view showing in FIGURE 2–B indicates a large central V-shaped scraping and kneading blade 270 in the exact center, and the wings of that blade run back at a 45° angle to a final width covering about half the entire transverse dimension of the box. At each end, a similar blade 272 is positioned beginning at the extreme end of the box and sloping in toward the center to deflect about one quarter of the material inward. At the quarter points between the advancing points of blades 270 and 272 I provide similar blades 274 having much shorter wings which extend in both directions to span only about one-eighth of the transverse extent of the box 134.

Thus the advancing material is encountered along the same transverse line with 5 points, two at the extreme ends and three intermediate points, defining four openings of equal transverse extent. This action is diagrammatically shown just to the rear of transverse line B–1 in the diagram of FIGURE 3. In FIGURE 3 the blades 270, 272, and 274 are indicated in correct plan view. Beyond that the transverse lines B–2, B–3, B–4, and B–5 and B–6 are spaced approximately with the longitudinal spacing that the contours shown will occupy at any given time.

When the material has arrived at the line B–1a of FIGURE 3 the loose material will have been pushed forward and downward and diagonally sideward into piled up accumulations for windrows that are four in number, and no contour line is given for that condition in FIGURE 3.

I prefer to have all the blades in the frame 134 with their lower portions curved back in a scimitar curve as indicated in FIGURE 6 with a vertical portion 276 and a gently curving portion 278 swept back so that it pushes downward as well as forward and diagonally sideways with a rolling-pin action, modified by the friction between the blade and the material. This works the plastic material forcefully, and the bottoms of the grooves gouged by the points 248 of the scarifier are effectively filled in. At the same time four windrows of piled material are present at line B–1a and these windrows are pushed together by blades 270 and 274 and issue as much higher windrows at 280 on contour line B–2. In all these contour lines the actual vertical dimensions of the piled up material, compared with the transverse extent of the diagram, have been multiplied by 5 or 10 to indicate the operation clearly.

The windrows 280 now encounter a different set of blades in the box frame 282, illustrated on a larger scale in FIGURE 4.

Whereas all the kneading blades 270, 272, and 274 extend at an angle of 45° to the line of movement, the larger front kneading blade 284 has its wings swept back only 36° rather than 45°. If there were no friction between the material and the kneading blade the lateral component of force on the blades 270, 272, and 274 would be equal to the longitudinal, whereas with the flatter angle of FIGURE 4 the forward component is about 40% greater than the lateral component. However, it is obvious that these angles are not effective in actual operation because of the heavy friction between the blade and the material, with the blade traveling in a direction at an angle to its plane of contact. There is much friction and sliding and stirring action at the face of both blades because the material pressing directly against the blade is heavily acted on by friction and the plastic nature of the material permits the sliding action to stir the material. A fair estimate is that the divergence of the angle of actual effective force exerted on the material is about half whit it would be if there were no such friction. Thus the material pressing on the kneading blades 270, 272, and 274 is pushed forward considerably more than laterally and works its way across the face of the blade until it escapes below, and around the trailing edge.

I prefer to have the wings of the large blade 284 substantially vertical as indicated in FIGURE 5, and the material in front of it piles up and tumbles around irregularly as indicated at 286 and passes under it, leaving a substantially flat, substantially smooth upper surface at 288. The mechanical load on this kneading blade is so heavy that I prefer to reinforce it by vertical ribs 290 and a horizontal rib 292.

Close behind the blade 284 I position a supply conduit 294 from which a fine spray is delivered as indicated at 296 to apply the conventional tack coat common in this type of operation. The spray pipe 294 covers just a trifle more than 50% of the transverse extent of the strip of roadbed being processed, and the tack coat has time to spread out on the surface 288 before the next kneading occurs.

The blade 284 leaves all the fresh mix piled up in two high windrows 298 close to the outer edge of the strip as indicated by the curve on the base line B-3, and the transverse extent of the tack coat is indicated by arrows 300.

The material now encounters convergent kneading blades 302 slanting inward toward the center at the same angle as the outward inclination of the blade 284. This drags the piled material a considerable distance forward in the direction of movement as it works over to the center, and covers the tack coat previously applied to the center of the strip. Between the blades 302 a still larger single windrow 304 issues, drawn in FIGURES 3 with respect to base line B-4. This leaves the side portions of the strip scraped down to the same level as the surface 288 in FIGURE 5. The area thus exposed now receives its tack coat from side supply pipes 304 so that the entire transverse area of the strip has been first uncovered and then tack coated and will eventually be covered again, with the tack coat concentrated at the desired level and the fresh, plastic top kneaded into it.

The windrow 304 now encounters a small kneading blade 306 positioned in the center and that blade has its lower edge a trifle higher than the blades 284 and 302 so that the resulting contour on base line B-5 of FIGURE 3 has its level at the center (indicated at 308), a little higher than the intended final level on base line B-6.

In the configuration indicated on the base line B-5 with the bulk of the material in two windrows at 310, the material now encounters the conventional spreading helices 166 and 168. These achieve a close approximation to the final contour line indicated at 312 in FIGURE 3, and the final leveling off is conventional and comprises the well-known tamping, and smoothing with a plate behind the tamper, by means of the screed 170.

Others may readily adapt the invention for use under various conditions of service, by employing one or more of the novel features disclosed, or equivalents thereof. As at present advised, with respect to the apparent scope of my invention, I desire to claim the following subject matter:

1. Equipment for repairing asphalt surfaced roads comprising, in combination: an elongate chassis; power means carried by said chassis for moving said chassis longitudinally along a roadbed; a series of longitudinally spaced processing units on said chassis; adjustable means operatively connected between said chassis and said operating units for moving said processing units into and out of operative engagement with said roadbed; means supported on the front end of said chassis for receiving hot mix; conveyor means on said chassis for conveying said hot mix rearwardly along said chassis and past certain of said processing units; and means operatively connected to said conveyor means for depositing said hot mix at one or more predetermined longitudinal points with respect to said chassis; said points of deposit being spaced in front of at least some of said processing units.

2. Equipment according to claim 1 in combination with means operatively associated with said conveyor means for heating said hot mix while it travels rearwardly along said chassis.

3. Equipment according to claim 1 in which said conveyor means extends up and over said processing units.

4. Equipment according to claim 1 in which said processing units include: first, a radiant heater; second, a scarifier adapted to displace material softened by said first unit and dislodge additional material from the substrate below said softened material and mix said dislodged material with said softened material into a loosely piled mass presenting maximum area to incident radiation from above; third, a second radiant heater for heating said loosely piled mass; fourth, diagonally arranged blades for engaging substantially all dislodged material in their path and shifting said engaged material transversely and diagonally forward into one or more windrows; fifth, additional diagonally arranged blades for distributing the windrowed material from said fourth unit and piling it in one or more new windrows laterally offset from the previous windrows; all five of said processing units being adjustably mounted on said chassis; whereby the entirety of said dislodged material is thoroughly and repeatedly mixed; and means connected to said chassis to the rear of said fourth and fifth units, for tamping, screeding, and compacting the new roadbed.

5. Equipment according to claim 4 in which said depositing means is arranged to deposit said mix on said roadbed uniformly and in front of said tamping, screeding, and compacting means.

6. Equipment according to claim 5 in which said depositing means is adapted to deposit said new mix in front of at least one of said diagonal blade units.

7. Heating means for heating roadbeds, comprising, in combination: an elongate chamber having side, and top walls, and an open bottom facing downwardly; means at one, inlet end of said chamber for blowing burning, non-oxidizing gases into said chamber; means for receiving gases coming out of the other, outlet end of said chamber; and a plurality of depending diagonal baffles in said chamber positioned to define a series of cells and a through passage across the lower sides of said cells to the exit end of said chamber; said baffles being arranged to generate a vortex in each cell to scavenge and mix the non-oxidizing gases and accelerate the completion of combustion.

8. Heating means according to claim 7 in which said baffles are inclined diagonally downward and in the direction of movement of the gases in said through passage.

9. Heating means according to claim 7 in which said baffles have radiant surfaces of irregular shape, whereby said surfaces have a radiating area greater than that of a plane surface extending over the same projected area.

10. Heating means according to claim 7 in which said baffles are thermally insulated from said chamber walls.

11. Heating means according to claim 10 in which said baffles define cells closed except for a narrow slit-like space around the periphery of each baffle; with the open bottoms of said cells defining the upper limits of said through passage.

12. Heating means according to claim 7 in which said baffles are of thermally resistant material having surface characteristics approximating black body radiation efficiency.

13. The method of reconditioning and improving secondary highways of asphalt concrete which comprises: (1) blanketing the old surface with a lambent, turbulent flame of burning gases in which the preponderance of reducing gases substantially prevent the substance of the roadbed from losing its own residual volatiles by feeding the flame; (2) roweling the roadbed deeply enough to tear out fragments of substantially unheated material below the hot top layer resulting from step (1), to build up a random rubble containing said unheated fragments mixed with the previously heated material; (3) subjecting the rubble from step (2) to a repetition of the same heating action recited in step (1) to impart into the material an additional increment of heat greater than that imparted by step (1); and (4) mechanically spreading, leveling, and impacting the entire hot, displaced roadbed material resulting from step (3) into a compacted stratum having its lower side in intimate, welded contact with the irregular top of the undisplaced material left in situ by step (2), and its upper face smooth and freely available to normal vehicular traffic within a matter of minutes after step (4) is completed.

14. A method according to claim 13 in which, during each of steps (1) and (3), the heat transfer by direct gaseous contact is accompanied by intense radiation in a wavelength range beginning in the middle of the visible spectrum and extending on both sides of the lower limit of visibility.

15. A method according to claim 13 in which step (3) is followed by an additional interposing step of depositing a predetermined increment of additional extraneous hot asphalt concrete mix on the roadbed left by step (3); the subsequent step (4) remaining unchanged.

References Cited

UNITED STATES PATENTS

| | | | |
|---|---|---|---|
| 1,952,452 | 3/1934 | Monroe | 94—39 |
| 1,984,849 | 12/1934 | Van Allen | 126—271.2 |
| 2,241,299 | 5/1941 | Finlay | 94—44 |
| 2,273,254 | 2/1942 | Davis | 94—42 X |
| 2,394,017 | 2/1946 | Seaman | 94—44 |
| 2,705,906 | 4/1955 | Fizzell | 94—39 |
| 3,055,280 | 9/1962 | Neville | 94—42 |
| 3,160,154 | 12/1964 | Sowell | 126—271.2 |
| 3,221,617 | 12/1965 | Quigg | 94—42 |

CHARLES E. O'CONNELL, *Primary Examiner.*

N. C. BYERS, *Assistant Examiner.*

UNITED STATES PATENT OFFICE
CERTIFICATE OF CORRECTION

Patent No. 3,361,042                                                                January 2, 1968

Earl F. Cutler

It is hereby certified that error appears in the above numbered patent requiring correction and that the said Letters Patent should read as corrected below.

Column 1, line 47, for "sacrificing" read -- scarifying -- column 2, line 64, for "surves" read -- curves --; column 3, line 57, before "mix" insert -- new --; column 4, line 10, for "raised" read -- raise --; line 35, for "66" read -- 86 --; column 5, line 55, for "conventioner" read -- conventional --; line 65, for "fro" read -- for --; column 6, line 11, for "its" read -- it --; line 54, for "besirable" read -- desirable --; line 55, for "its" read -- it --; column 7, line 23, for "troweling" read -- roweling --; column 8, line 53, for "whit" read -- what --; column 9, line 11, for "FIGURES" read -- FIGURE --; column 10, line 45, for "radiation" read -- radiating --.

Signed and sealed this 11th day of February 1969.

(SEAL)
Attest:

EDWARD M. FLETCHER, JR.                                    EDWARD J. BRENNER
Attesting Officer                                                Commissioner of Patents